(12) United States Patent
Wang et al.

(10) Patent No.: US 7,522,408 B2
(45) Date of Patent: Apr. 21, 2009

(54) FLAT DISPLAY HAVING SUPPORTING BRACKET

(75) Inventors: Te-Hsu Wang, Miao-Li (TW); Ming-Chuan Li, Miao-Li (TW)

(73) Assignee: Innolux Display Corp., Miao-Li County (TW)

( * ) Notice: Subject to any disclaimer, the term of this patent is extended or adjusted under 35 U.S.C. 154(b) by 402 days.

(21) Appl. No.: 11/414,927

(22) Filed: May 1, 2006

(65) Prior Publication Data

US 2006/0243682 A1    Nov. 2, 2006

(30) Foreign Application Priority Data

Apr. 29, 2005 (TW) .............................. 94206893 U

(51) Int. Cl.
*G06F 1/16* (2006.01)
(52) U.S. Cl. ..................... 361/681; 349/58; 248/917
(58) Field of Classification Search ............... 361/681; 248/917; 349/58
See application file for complete search history.

(56) References Cited

U.S. PATENT DOCUMENTS

| | | | |
|---|---|---|---|
| 6,094,340 A * | 7/2000 | Min | 361/681 |
| 6,229,584 B1 | 5/2001 | Chuo | |
| 6,276,655 B1 * | 8/2001 | Byoun | 361/679 |
| 6,400,560 B1 * | 6/2002 | Chian | 361/681 |
| 7,126,815 B2 * | 10/2006 | Hwang et al. | 361/681 |
| 7,198,237 B2 * | 4/2007 | Cho et al. | 248/133 |
| 7,336,479 B2 * | 2/2008 | Liu et al. | 361/681 |
| 7,384,019 B2 * | 6/2008 | Choi | 248/136 |
| 2003/0132360 A1 * | 7/2003 | Ju | 248/371 |
| 2006/0018092 A1 * | 1/2006 | Nagano | 361/687 |
| 2006/0146487 A1 * | 7/2006 | Huang | 361/681 |

\* cited by examiner

*Primary Examiner*—Lisa Lea-Edmonds
(74) *Attorney, Agent, or Firm*—Wei Te Chung

(57) ABSTRACT

A flat display (10) includes a flat display panel (11) movably disposed on a supporting bracket (12). The supporting bracket has an opening (1210) on a top surface and a channel (128) crossing a bottom thereof. At least one cable (15) sequentially passes through the opening and into the channel of the supporting bracket, the cable configured for electrically and/or communicatingly connects the flat display and a host computer.

16 Claims, 5 Drawing Sheets

FLAT DISPLAY HAVING SUPPORTING BRACKET

FIELD OF THE INVENTION

The present invention relates to a flat display such as a liquid crystal display, and in particular to a flat display having a supporting bracket with a cable-receiving structure.

BACKGROUND

FIGS. 7 and 8 show a conventional liquid crystal display. The liquid crystal display (LCD) has a liquid crystal display panel 1, a base 2, and a supporting arm 3. The LCD 1 panel is pivoted to the supporting arm 3 via a hinge 6.

Generally, signal and power cables are used to connect conventional LCDs to host computers. The signal and power cables attached to each LCD are required to be at least 1.5 to 2.5 m long, in order to enable a desktop or tower computer suite to be suitably set up. When the cables are longer than the distance between the host computer and the LCD, users may deal with the excess portions of the cables by bundling them, laying them on the desk or the floor, or winding them around the supporting arm of the LCD. Each of these measures tends to make the desktop or its environment untidy. In addition, loose cables are liable to cause accidents.

Accordingly, what is needed is an improved supporting bracket for a flat display, by which signal and power cables can be orderly arranged.

SUMMARY

A flat display includes a flat display panel movably disposed on a supporting bracket. The supporting bracket has an opening on a top surface and a channel crossing a bottom thereof. At least one cable sequentially passes through the opening and into the channel of the supporting bracket, the cable configured for electrically and/or communicatingly connects the flat display and a host computer.

The flat display panel is a liquid crystal display panel or another kind of flat display. The opening is at a top surface of the supporting bracket and adjacent to the joint portion. The supporting bracket has at least one partition at the bottom thereof. The supporting bracket has a joint portion with a shaft protruding from a side surface of the joint portion, and the flat display panel is pivoted to the supporting bracket by the hinge and the shaft. The joint portion is hollow to receive the hinge and has a corresponding hole on a surface perpendicular to the hinge. The opening, the hole, and the cross-section of the channel are rectangular, arched, or trapezoid.

A detailed description is given below in relation to various embodiments and with reference to the accompanying drawings.

BRIEF DESCRIPTION OF THE DRAWINGS

Embodiments of the invention can be more fully understood by reading the subsequent detailed description and examples with references made to the accompanying drawings, wherein.

DETAILED DESCRIPTION OF PREFERRED EMBODIMENTS

Figure 1:
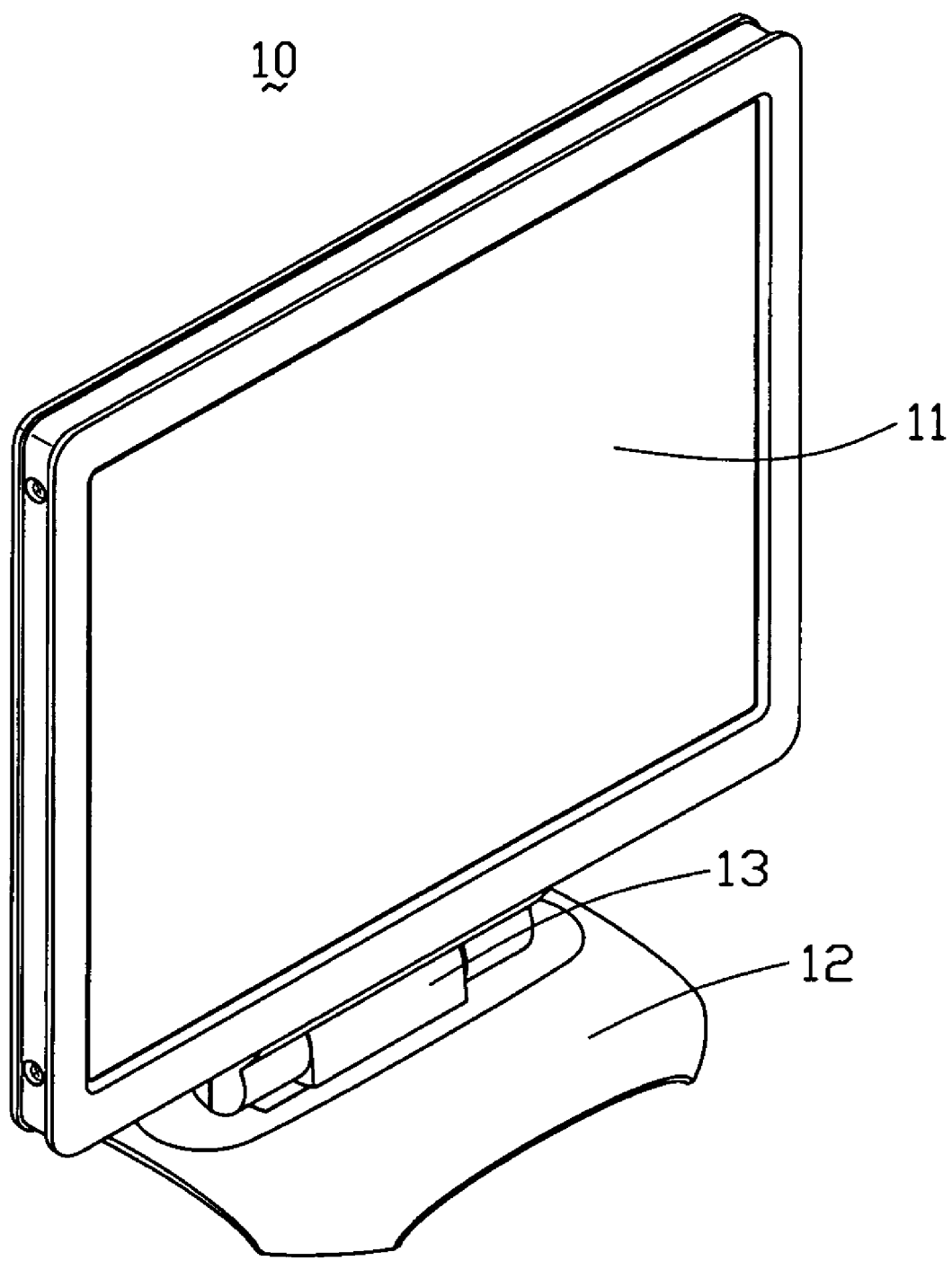
FIG. 1 is an isometric view of a flat display in accordance with an exemplary embodiment of the invention, the flat display including a supporting bracket.

FIG. 1 shows a flat display 10 in accordance with an exemplary embodiment of the invention. The flat display 10 can be a liquid crystal display or another kind of flat display. The flat display 10 includes a flat display panel 11 and a supporting bracket 12. The flat display panel 11 is pivoted to a joint portion 13 of the supporting bracket 12.

Figure 2:
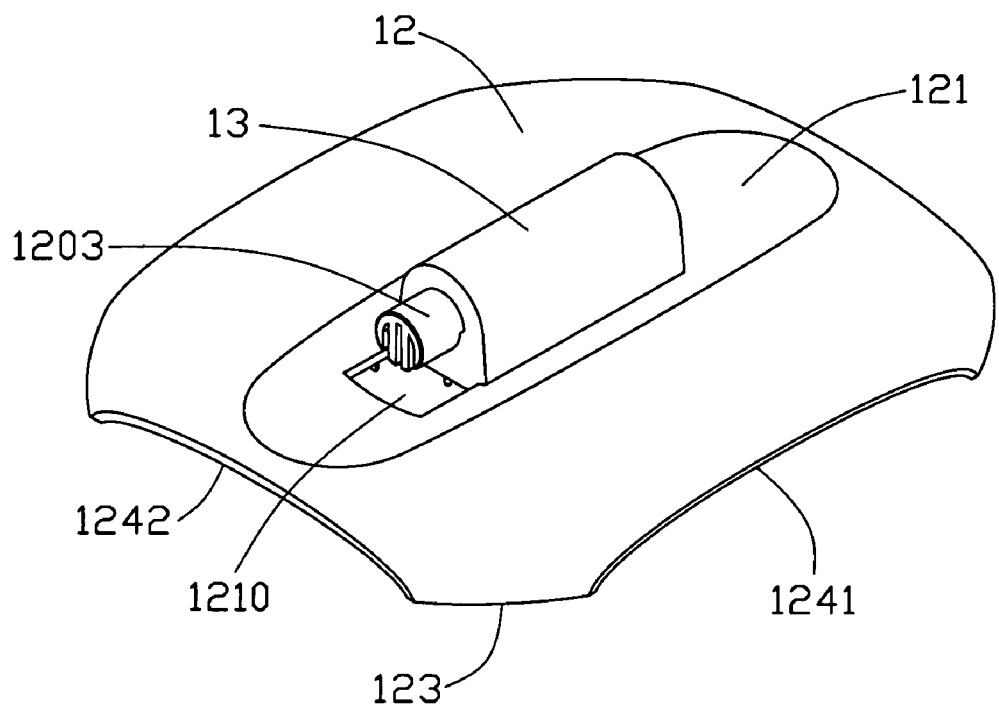
FIG. 2 is an enlarged, isometric view of the supporting bracket of FIG. 1, the supporting bracket including a central joint portion.

FIG. 2 shows the supporting bracket 12 of the flat display 10. The supporting bracket 12 is gently humped, with the joint portion 13 provided at a center of the supporting bracket 12. The supporting bracket 12 has a shallow, elongate recess 121 provided along a center of a top surface thereof, the recess 121 spanning from a left lateral side of the supporting bracket 12 to an opposite right lateral side of the supporting bracket 12. The joint portion 13 is seated in a middle of the recess 121 and integrally connects with the supporting bracket 12 at a bottom of the recess 121. A rectangular opening 1210 is defined in the supporting bracket 12 at the recess 121, adjacent to a left side of the joint portion 13. The opening 1210 can alternatively be arch-shaped or trapezoidal, or have another suitable shape.

Figure 3:
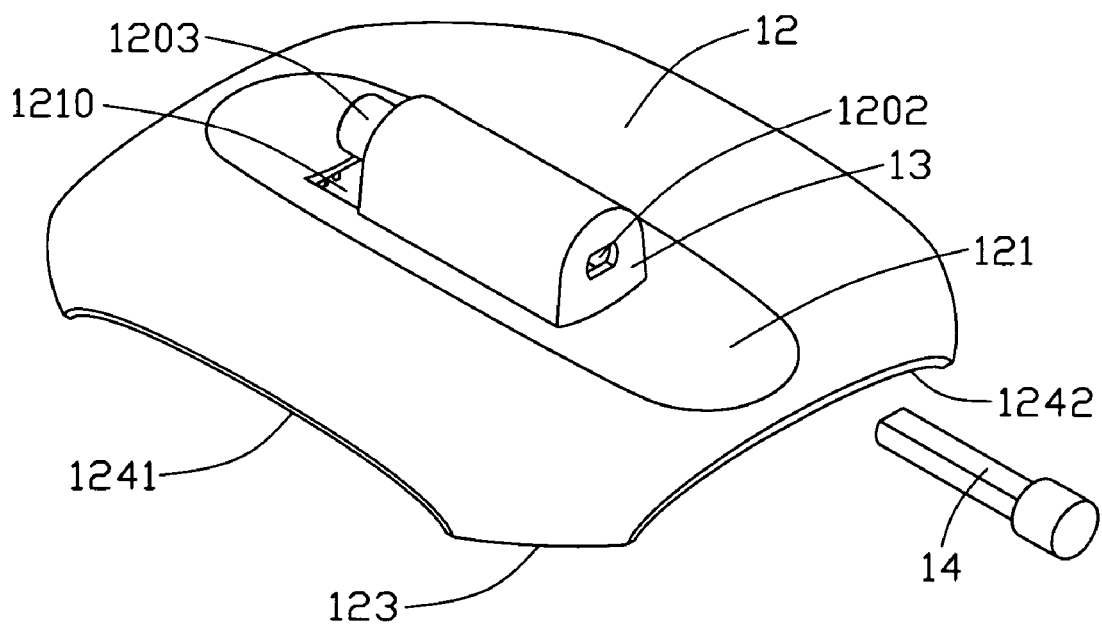
FIG. 3 is similar to FIG. 2, but viewed from another aspect and showing a hinge ready to be inserted into the joint portion of the supporting bracket.

Referring also to FIG. 3, the joint portion 13 is elongate and hollow, and has an arch-shaped cross-section. A shaft 1203 integrally extends from the left side of the joint portion 13. That is, the shaft 1203 is located above the opening 1210. A keyed hole 1202 is defined in a right side of the joint portion 13, for receiving part of a hinge 14 therethrough. Thereby, the flat display panel 11 can be pivoted to the supporting bracket 12 by the hinge 14 and the shaft 1203. In the illustrated embodiment, the keyed hole 1202 defines two straight sides and two curved sides. In alternative embodiments, the keyed hole 1202 can be arch-shaped or trapezoidal, or have another suitable shape.

The supporting bracket 12 has four corner portions 123 that function as feet for supporting the supporting bracket 12 on a surface such as a desktop. Bottom surfaces of the corner portions 123 are flat and coplanar with each other. When viewed from above, edges of the corner portions 123 are arcuate. The supporting bracket 12 also has two connecting edges 1241 at a front and a rear thereof respectively. The connecting edges 1241 are arcuate, and interconnect respective corner portions 123. The supporting bracket 12 further has two connecting edges 1242 at the left and right sides thereof respectively. The connecting edges 1242 are arcuate, and interconnect respective corner portions 123. A length of the arcuate edge of each corner portion 123 is less than a length of each of the connecting edges 1241, and less than a length of each of the connecting edges 1242. The configuration of the supporting bracket 12 is not limited to the above description, and can be varied according to the particular needs of a given application, such as the mechanical strength required by the flat display 10.

Figure 4:
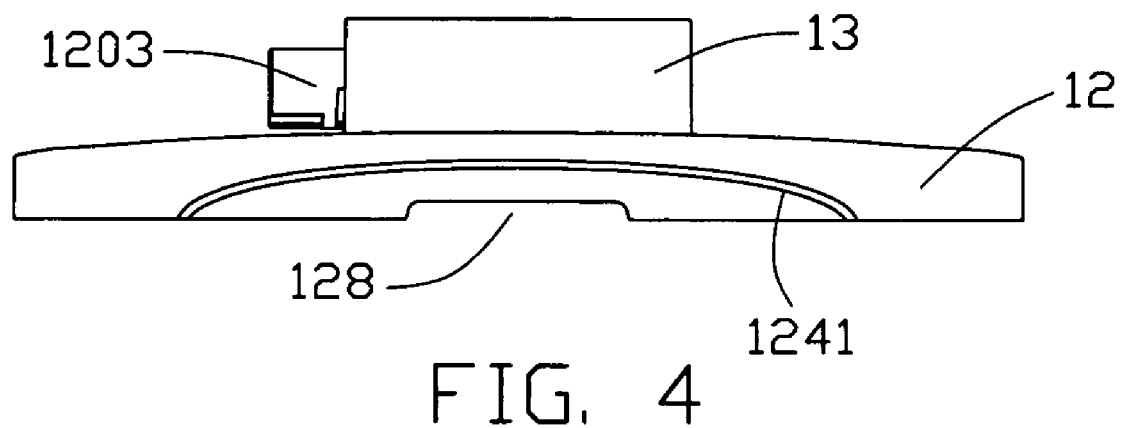
FIG. 4 is a front plan view of the supporting bracket shown in FIG. 2.

Referring also to FIG. 4, the supporting bracket 12 further defines a channel 128 at a bottom thereof. The channel 128 is perpendicular to the joint portion 13, and spans from the front to the rear of the supporting bracket 12. A cross-section defined by the channel 128 is generally rectangular. A height of the channel 128 is configured to allow signal and/or power cables of the flat display 10 to pass through the bottom of the supporting bracket 12 when the supporting bracket 12 is on a surface such as a desktop. In the illustrated embodiment, the channel 128 is defined through a partition (not labeled) that extends from the left side to the right side at the bottom of the supporting bracket 12. The partition enhances a mechanical strength of the supporting bracket 12.

Figure 5:
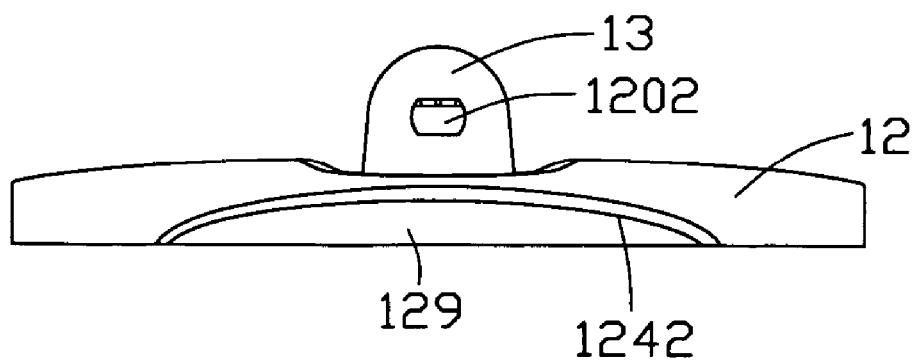
FIG. 5 is a right side plan view of the supporting bracket shown in FIG. 2.

Referring also to FIG. 5, the supporting bracket 12 further has a pair of partitions 129 respectively at the left and right sides of the bottom thereof. The partitions 129 extend from the front to the rear of the supporting bracket 12, and enhance the mechanical strength of the supporting bracket 12.

Figure 6:
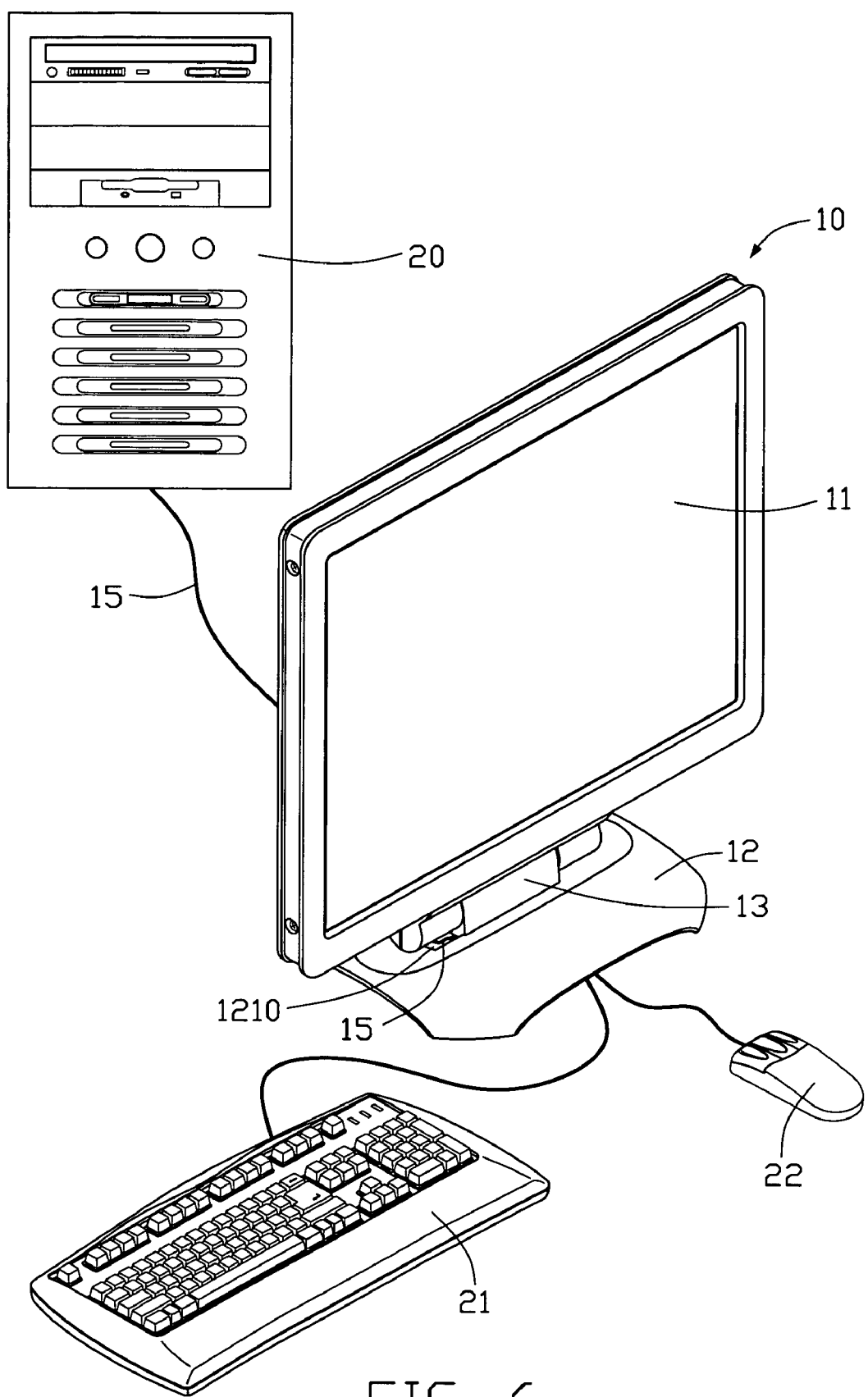
FIG. 6 is a schematic view showing the flat display of FIG. 1 connected to a host computer, a keyboard, and a mouse.
Figure 7:
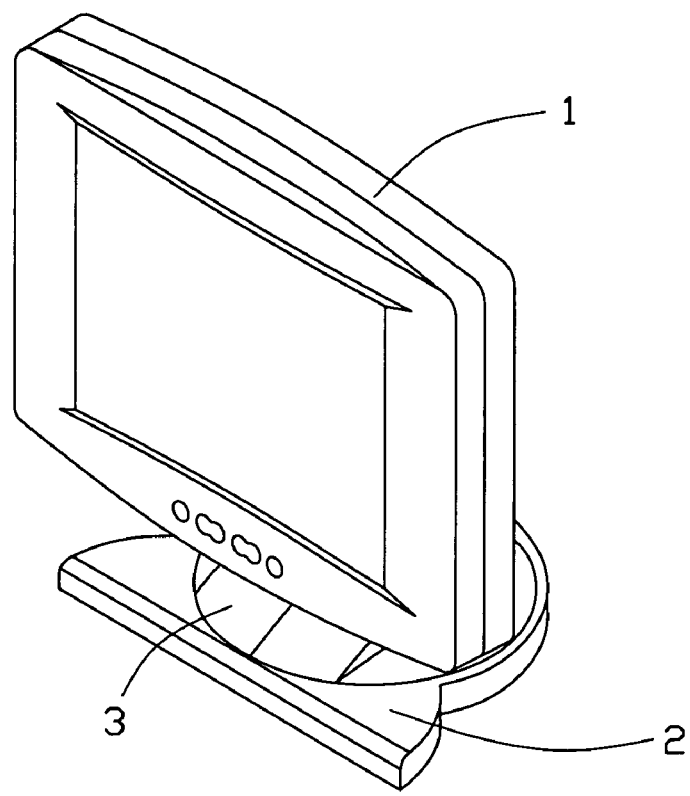
FIG. 7 is an isometric view of a conventional liquid crystal display.
Figure 8:
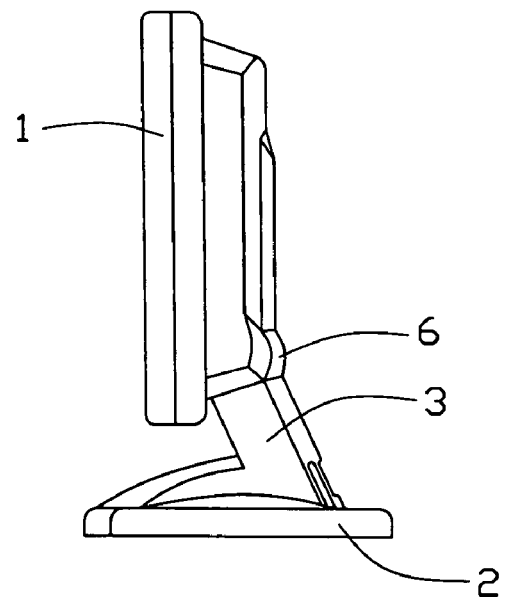
FIG. 8 is a right side plan view of the liquid crystal display shown in FIG. 7.

FIG. 6 shows the flat display 10 electrically connected to a host computer 20 via a signal and/or power cable 15. The cable 15 is first connected to a connector (not shown) at a back side of the flat display panel 11, and is arranged to sequentially pass through the opening 1210 and the channel 128 of the supporting bracket 12. Simultaneously, a signal and/or power cable (not labeled) of a keyboard 21 and a signal and/or power cable (not labeled) of a mouse 22 can be positioned along the channel 128 too. Any excess portions of the cable 15 can also be received in the channel 128 under the supporting bracket 12, in the case when the cable 15 is longer than a distance between the host computer 20 and the flat display 10. Thus, the cable 15 can be positioned in an ordered arrangement. Similarly, any excess portions of the cables of the keyboard 21 and mouse 22 can also be received in the channel 128, in the case when these cables are longer than a distance between the host computer 20 and the keyboard 21 and/or the mouse 22.

In other embodiments, the channel 128 of the supporting bracket 12 for the flat display 10 can instead be a channel that spans directly from the left side to the right side of the supporting bracket 12, or can instead be a channel that spans obliquely from one side to another side of the supporting bracket 12. The channel 128 can instead define an arcuate, arch-shaped or trapezoidal cross-section, or a cross-section having another suitable shape.

Further, there may instead be a plurality of channels at the bottom of the supporting bracket 12. The channels may be parallel to each other or cross each other. Thereby, different cables can be disposed in different channels for an optimal arrangement of cables.

Unlike with conventional LCDs, the supporting bracket 12 of the flat display 10 (and each of various alternative embodiments thereof) provides an additional cable receiving space for receiving any excess portions of power and/or signal cables. Thereby, the cables can be positioned in an ordered arrangement.

While the invention has been described by way of example and in terms of the preferred and exemplary embodiments, it is to be understood that the invention is not limited thereto. To the contrary, the invention is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A flat display, comprising:
    a flat display panel;
    a supporting bracket comprising a channel crossing the bottom thereof; and
    a hinge connecting the flat display panel and the supporting bracket;
    wherein the supporting bracket further comprises a joint portion with a shaft protruding from a side surface thereof and the flat display panel is pivoted by the hinge and the shaft; and
    wherein the joint portion is hollow, and defines a hole in a sidewall thereof opposite to the side surface with the shaft, and the hinge is received through the hole on the joint portion.

2. The flat display as claimed in claim 1, wherein a cross-section defined by the channel is rectangular, arcuate, arch-shaped, or trapezoidal.

3. The flat display as claimed in claim 1, wherein the supporting bracket further comprises at least one partition at the bottom thereof.

4. The flat display as claimed in claim 1, wherein the hole is keyed.

5. The flat display as claimed in claim 1, wherein the supporting bracket further comprises an opening at a top surface thereof adjacent to the joint portion.

6. The flat display as claimed in claim 5, wherein the opening is rectangular, arch-shaped, or trapezoidal.

7. The flat display as claimed in claim 1, wherein the flat display panel is a liquid crystal display panel.

8. A flat display, comprising:
    a supporting bracket comprising an opening at a top surface and a channel crossing a bottom thereof;
    a flat display panel disposed on the supporting bracket;
    a cable sequentially passing through the opening and into the channel of the supporting bracket, the cable configured for electrically and/or communicatingly connecting the flat display and a host computer.

9. The flat display as claimed in claim 8, further comprising a hinge connecting the flat display panel and the supporting bracket.

10. The flat display as claimed in claim 9, wherein the supporting bracket further comprises a joint portion with a shaft protruding from a side surface thereof, and the flat display panel is pivoted by the hinge and the shaft.

11. The flat display as claimed in claim 10, wherein the joint portion is hollow and defines a hole in a sidewall thereof opposite to the side surface with the shaft, and the hinge is received through the hole in the joint portion.

12. The flat display as claimed in claim 9, wherein a cross-section defined by the channel is rectangular, arcuate, arch-shaped, or trapezoidal.

13. The flat display as claimed in claim 9, wherein the supporting bracket further comprises at least one partition at the bottom thereof.

14. A flat display, comprising:
    a supporting bracket;
    a flat display panel movably disposed on the supporting bracket; and
    a cable configured for electrically and/or communicatingly connecting the flat display and a host computer; wherein the supporting bracket comprises:
        structures retaining a redundant length of the cable in a hidden manner, if a distance between the flat display panel and the host computer is smaller than a length of the cable;
        a channel crossing a bottom thereof, and the cable is received in the channel of the supporting bracket; and
        an opening at a top surface thereof, and the cable passes through the opening and into the channel.

15. The flat display as claimed in claim 14, wherein the opening is rectangular, arch-shaped, or trapezoidal.

16. The flat display as claimed in claim 14, wherein the flat display panel is a liquid crystal display panel.

* * * * *